(12) United States Patent
Spahr et al.

(10) Patent No.: US 8,196,894 B2
(45) Date of Patent: Jun. 12, 2012

(54) CHECK VALVES FOR FUEL CARTRIDGES

(75) Inventors: Paul P. Spahr, New Haven, CT (US); Andrew J. Curello, Hamden, CT (US)

(73) Assignee: Societe BIC (FR)

( * ) Notice: Subject to any disclaimer, the term of this patent is extended or adjusted under 35 U.S.C. 154(b) by 1034 days.

(21) Appl. No.: 12/048,921

(22) Filed: Mar. 14, 2008

(65) Prior Publication Data

US 2008/0160371 A1    Jul. 3, 2008

Related U.S. Application Data

(63) Continuation-in-part of application No. 11/327,580, filed on Jan. 6, 2006.

(51) Int. Cl.
*F16K 31/44* (2006.01)

(52) U.S. Cl. ............................ 251/83; 137/859; 137/844

(58) Field of Classification Search .................. 137/843, 137/844, 846, 850, 859; 251/82, 83
See application file for complete search history.

(56) References Cited

U.S. PATENT DOCUMENTS

| | | | | |
|---|---|---|---|---|
| 2,743,737 | A * | 5/1956 | Textor | 137/493 |
| 3,556,122 | A * | 1/1971 | Laerdal | 137/102 |
| 4,086,943 | A | 5/1978 | Fernandez | |
| 4,261,956 | A | 4/1981 | Adlhart | |
| 4,524,805 | A | 6/1985 | Hoffman | |
| 4,726,390 | A * | 2/1988 | Franklin | 137/218 |
| 4,772,278 | A | 9/1988 | Baber | |
| 4,775,301 | A * | 10/1988 | Cartwright et al. | 417/417 |
| 4,948,092 | A | 8/1990 | Kasper | |
| 5,364,977 | A | 11/1994 | Asai | |
| 5,723,229 | A | 3/1998 | Scheifers | |
| 5,971,024 | A * | 10/1999 | Penny | 137/859 |
| 6,129,714 | A | 10/2000 | Kocsi | |
| 6,227,818 | B1 | 5/2001 | Falk | |
| 6,234,018 | B1 | 5/2001 | Kelada | |
| 6,439,541 | B1 | 8/2002 | Nosel | |
| 6,506,513 | B1 | 1/2003 | Yonetsu | |
| 6,512,005 | B2 | 1/2003 | Bercovic | |
| 6,554,877 | B2 | 4/2003 | Finkelshtain | |
| 6,562,497 | B2 | 5/2003 | Finkelshtain | |
| 6,758,871 | B2 | 7/2004 | Finkelshtain | |
| 6,773,470 | B2 | 8/2004 | Finkelshtain | |
| 7,028,981 | B2 | 4/2006 | Horton | |
| 7,147,955 | B2 | 12/2006 | Adams | |
| 7,565,744 | B2 * | 7/2009 | Matsui et al. | 29/890.131 |
| 2002/0076602 | A1 | 6/2002 | Finkelshtain | |
| 2002/0197522 | A1 | 12/2002 | Lawrence | |
| 2003/0077493 | A1 | 4/2003 | Colborn | |
| 2003/0082427 | A1 | 5/2003 | Prasad | |
| 2003/0096150 | A1 | 5/2003 | Rice | |
| 2004/0211468 | A1 | 10/2004 | Horton | |
| 2005/0022883 | A1 | 2/2005 | Adams | |
| 2006/0196562 | A1 | 9/2006 | Curello | |

* cited by examiner

*Primary Examiner* — John Fristoe, Jr.
(74) *Attorney, Agent, or Firm* — The H.T. Than Law Group

(57) ABSTRACT

In accordance with different embodiments of the present invention, duckbill check valve 10, having an orifice 11, and conical check valve 12, having an orifice 13, are responsive to the differential pressure of fluid F as it flows between inlet 14 and outlet 16. In an innovative aspect of the invention, orifice 11 and orifice 13 each have a variable effective diameter. In one embodiment, the duckbill check valve 10 and conical check valve 12 have a conical end that is aligned with the direction of fluid flow. In another embodiment, the duckbill check valve 10 can have a conical end that faces the direction of fluid flow. A pin may traverse orifice 11 or 13.

27 Claims, 4 Drawing Sheets

CHECK VALVES FOR FUEL CARTRIDGES

CROSS-REFERENCE TO RELATED APPLICATIONS

This application is a continuation-in-part of U.S. application Ser. No. 11/327,580, filed Jan. 6, 2006, which is incorporated herein by reference in its entirety.

FIELD OF THE INVENTION

This invention generally relates to valves for cartridges supplying fuel to various fuel cells. More particularly, this invention relates to pressure-sensitive check valves with a variable diameter orifice.

BACKGROUND OF THE INVENTION

Fuel cells are devices that directly convert chemical energy of reactants, i.e., fuel and oxidant, into direct current (DC) electricity. For an increasing number of applications, fuel cells are more efficient than conventional power generation, such as combustion of fossil fuel, as well as portable power storage, such as lithium-ion batteries.

In general, fuel cell technology includes a variety of different fuel cells, such as alkali fuel cells, polymer electrolyte fuel cells, phosphoric acid fuel cells, molten carbonate fuel cells, solid oxide fuel cells and enzyme fuel cells. Today's more important fuel cells can be divided into several general categories, namely (i) proton exchange membrane or polymer electrolyte membrane (PEM) fuel cells that use compressed hydrogen ($H_2$) as fuel or substances that can be reformed into hydrogen, such as alcohols, e.g., methanol ($CH_3OH$), metal hydrides, e.g., sodium borohydride ($NaBH_4$), hydrocarbons, or other reformable fuels; (ii) PEM fuel cells that can consume non-hydrogen fuel directly or direct oxidation fuel cells, such as direct methanol fuel cells (DMFC); and (iii) solid oxide fuel cells (SOFC) that directly convert hydrocarbon fuels to electricity at high temperature.

Most hydrogen fuel cells have a proton exchange membrane or polymer electrolyte membrane (PEM), which allows the hydrogen's protons to pass through but forces the electrons to pass through an external circuit, which advantageously can be a cell phone, a personal digital assistant (PDA), a computer, a power tool or any device that uses electron flow or electrical current. The fuel cell reaction can be represented as follows:

Half-reaction at the anode of the fuel cell:

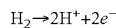

$$H_2 \rightarrow 2H^+ + 2e^-$$

Half-reaction at the cathode of the fuel cell:

$$2(2H^+ + 2e^-) + O_2 \rightarrow 2H_2O$$

Generally, the PEM is made from a polymer, such as Nafion® available from DuPont, which is a perfluorinated sulfonic acid polymer having a thickness in the range of about 0.05 mm to about 0.50 mm, or other suitable membranes. The anode is typically made from a Teflonized carbon paper support with a thin layer of catalyst, such as platinum-ruthenium, deposited thereon. The cathode is typically a gas diffusion electrode in which platinum particles are bonded to one side of the membrane.

For DMFC, the chemical-electrical reaction at each electrode and the overall reaction for a direct methanol fuel cell are described as follows:

Half-reaction at the anode:

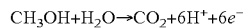

$$CH_3OH + H_2O \rightarrow CO_2 + 6H^+ + 6e^-$$

Half-reaction at the cathode:

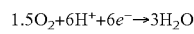

$$1.5O_2 + 6H^+ + 6e^- \rightarrow 3H_2O$$

The overall fuel cell reaction:

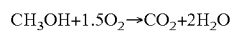

$$CH_3OH + 1.5O_2 \rightarrow CO_2 + 2H_2O$$

DMFCs are discussed in U.S. Pat. Nos. 4,390,603 and 4,828,941, which are incorporated by reference herein in their entireties.

In a chemical metal hydride fuel cell, sodium borohydride is reformed and reacts as follows:

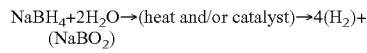

$$NaBH_4 + 2H_2O \rightarrow \text{(heat and/or catalyst)} \rightarrow 4(H_2) + (NaBO_2)$$

Suitable catalysts for this reaction include platinum and ruthenium, and other metals. The hydrogen fuel produced from reforming sodium borohydride is reacted in the fuel cell with an oxidant, such as $O_2$, to create electricity (or a flow of electrons) and water by-product, illustrated above. Sodium borate ($NaBO_2$) by-product is also produced by the reforming process. A sodium borohydride fuel cell is discussed in U.S. Pat. No. 4,261,956, which is incorporated by reference herein in its entirety.

Valves are needed for regulating and transporting fuel between fuel cartridges, fuel cells and/or fuel refilling devices. The known art discloses various valves and flow control devices, such as those described in U.S. Pat. Nos. 6,506,513 and 5,723,229 and in U.S. published Application Nos. 2003/0082427 and 2002/0197522. A need, however, exists for improved valves that allow venting of gas, maintaining seals, and improving the flow of fuel through the valve, among other things. To a certain extent, this need has been addressed by commonly owned, co-pending U.S. Published Application Nos. 2005/0022883 and 2006/0196562, as well as U.S. patent application Ser. No. 10/978,949, which are incorporated herein by reference in their entireties. Nonetheless, there still exists the need for a check valve that can automatically open and close in response to pressure and still positively seal against back flow.

SUMMARY OF THE INVENTION

The present invention concerns a valve comprising a variable diameter orifice, wherein the variable diameter orifice is responsive to a difference between an inlet pressure and an outlet pressure. The valve is fluidically connected to a fuel supply and either the inlet or outlet pressure corresponds to a pressure of the fuel supply. The valve has a conical shell comprising an apex with a variable diameter orifice and a base that is sealingly attached to a housing of the valve. The valve also has a pin affixed at one end to the housing, and the other end traverses through the variable diameter orifice. Responsive to the differential between the inlet and outlet, the orifice expands to allow fuel to flow through an annular opening between the orifice and the pin, and contracts to establish a seal between the conical shell and the pin.

The present invention further concerns a method of using this valve for controlling flow of a fuel. The valve described above can be used with our without the pin with the apex of the conical shell aligning with the flow of the fuel or aligning in the opposite direction.

BRIEF DESCRIPTION OF THE DRAWINGS

In the accompanying drawings, which form a part of the specification and are to be read in conjunction therewith and in which like reference numerals are used to indicate like parts in the various views.

DETAILED DESCRIPTION OF THE INVENTION

Figure 1A:
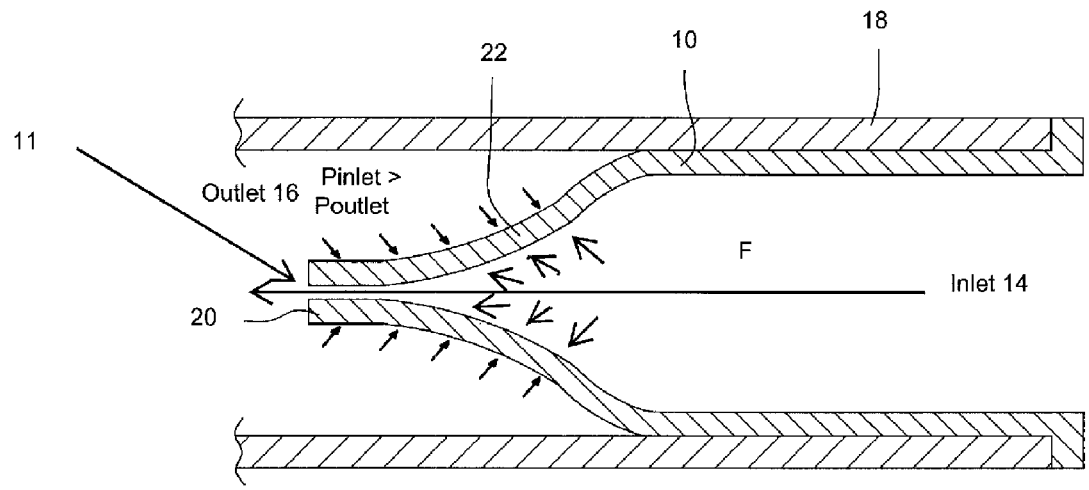
FIGS. 1A-1D are cross-sectional views of a duckbill check valve having a variable diameter orifice.

As illustrated in the accompanying drawings and discussed in detail below, the present invention is directed to a fuel supply, which stores fuel cell fuels, such as methanol and water, methanol/water mixture, methanol/water mixtures of varying concentrations, pure methanol, and/or methyl clathrates described in U.S. Pat. Nos. 5,364,977 and 6,512,005 B2, which are incorporated by reference herein in their entirety. Methanol and other alcohols are usable in many types of fuel cells, e.g., DMFC, enzyme fuel cells and reformat fuel cells, among others. The fuel supply may contain other types of fuel cell fuels, such as ethanol or alcohols; metal hydrides, such as sodium borohydrides; other chemicals that can be reformatted into hydrogen; or other chemicals that may improve the performance or efficiency of fuel cells. Fuels also include potassium hydroxide (KOH) electrolyte, which is usable with metal fuel cells or alkali fuel cells, and can be stored in fuel supplies. For metal fuel cells, fuel is in the form of fluid-borne zinc particles immersed in a KOH electrolytic reaction solution, and the anodes within the cell cavities are particulate anodes formed of the zinc particles. KOH electrolytic solution is disclosed in U.S. Pat. App. Pub. No. US 2003/0077493, entitled "Method of Using Fuel Cell System Configured to Provide Power to One or More Loads," published on Apr. 24, 2003, which is incorporated by reference herein in its entirety. Fuels can also include a mixture of methanol, hydrogen peroxide and sulfuric acid, which flows past a catalyst formed on silicon chips to create a fuel cell reaction. Moreover, fuels include a blend or mixture of methanol, sodium borohydride, an electrolyte, and other compounds, such as those described in U.S. Pat. Nos. 6,554,877, 6,562,497 and 6,758,871, which are incorporated by reference herein in their entireties. Furthermore, fuels include those compositions that are partially dissolved in a solvent and partially suspended in a solvent, described in U.S. Pat. No. 6,773,470 and those compositions that include both liquid fuel and solid fuels, described in U.S. Pat. Appl. Pub. No. US 2002/0076602. Suitable fuels are also disclosed in co-owned, co-pending U.S. Pat. Appl. No. 60/689,572, entitled "Fuels for Hydrogen-Generating Cartridges," filed on Jun. 13, 2005. These references are also incorporated by reference herein in their entireties.

Fuels can also include a chemical hydride such as sodium borohydride ($NaBH_4$) and an activator such as water, discussed above, or metal hydrides that absorb and adsorb hydrogen within the hydride's matrix at a certain temperature and pressure and release hydrogen to fuel the fuel cells at another temperature and pressure. Suitable metal hydrides, including but not limited to lanthanum pentanickel ($LaNi_5$) and the metal hydrides disclosed in commonly-owned U.S. Provisional Application Ser. No. 60/782,632 filed on Mar. 15, 2006, which is incorporated herein by reference in its entirety.

Fuels can further include hydrocarbon fuels, which include, but are not limited to, butane, kerosene, alcohol, and natural gas, as set forth in U.S. Pat. Appl. Pub. No. US 2003/0096150, entitled "Liquid Hereto-Interface Fuel Cell Device," published on May 22, 2003, which is incorporated by reference herein in its entirety. Fuels can also include liquid oxidants that react with fuels. The present invention is therefore not limited to any type of fuels, activators, electrolytic solutions, oxidant solutions or liquids or solids contained in the supply or otherwise used by the fuel cell system. The term "fuel" as used herein includes all fuels that can be reacted in fuel cells or in the fuel supply and includes, but is not limited to, all of the above suitable fuels, electrolytic solutions, oxidant solutions, gases, liquids, solids, and/or chemicals including additives and catalysts and mixtures thereof.

As used herein, the term "fuel supply" includes, but is not limited to, disposable cartridges, refillable/reusable cartridges, containers, cartridges that reside inside the electronic device, removable cartridges, cartridges that are outside of the electronic device, fuel tanks, fuel refilling tanks, other containers that store fuel and the tubings connected to the fuel tanks and containers. While a cartridge is described below in conjunction with the exemplary embodiments of the present invention, it is noted that these embodiments are also applicable to other fuel supplies and the present invention is not limited to any particular type of fuel supply.

The fuel supply of the present invention can also be used to store fuels that are not used in fuel cells. These applications can include, but are not limited to, storing hydrocarbons and hydrogen fuels for micro gas-turbine engines built on silicon chips, discussed in "Here Come the Microengines," published in The Industrial Physicist (December 2001/January 2002) at pp. 20-25. As used in the present application, the term "fuel cell" can also include microengines. Other applications can include storing traditional fuels for internal combustion engines and hydrocarbons, such as butane for pocket and utility lighters and liquid propane.

Different embodiments of the present invention are directed to variable diameter orifices or valves with variable diameter orifices. These orifices can vary their openings automatically, as a function of the velocity or pressure of the fluid passing through the orifice.

Duckbill check valve 10 (shown in FIGS. 1A-1D), having an orifice 11, and conical check valve 12 (shown in FIGS. 2A-2B), having an orifice 13, are responsive to the differential pressure of a fluid F, such as fuel, as it flows between inlet 14 and outlet 16. Orifice 11 and orifice 13 are responsive to a differential pressure that is at least 0.5 psi, preferably at least 1.0 psi, more preferably at least 2.0 psi, even more preferably at least 5.0 psi, and most preferably at least 10 psi. In an innovative aspect of the invention, orifice 11 and orifice 13 each have a variable effective diameter. In one embodiment, as shown in FIGS. 1A-1B and 2A-2B, the duckbill check valve 10 and conical check valve 12 have a conical end that is aligned with the direction of fluid flow. In another embodiment, as shown in FIGS. 1C-1D, the duckbill check valve 10 can have a conical end that faces the direction of fluid flow. As configured in FIGS. 1A-1D and FIGS. 2A-2B, duckbill check valve 10 and conical check valve 12 are coupled to or within a fluid conduit 18, which can provide fluid communication between a fuel supply (e.g., a fuel cartridge or gas-generating apparatus) and a device (e.g., a fuel cell or refilling device). Exemplary fuel cartridges and fuel cells are disclosed in commonly owned U.S. Pat. No. 7,147,955, entitled "Fuel Cartridge for Fuel Cells," which is incorporated herein by reference in its entirety.

Figure 1B:
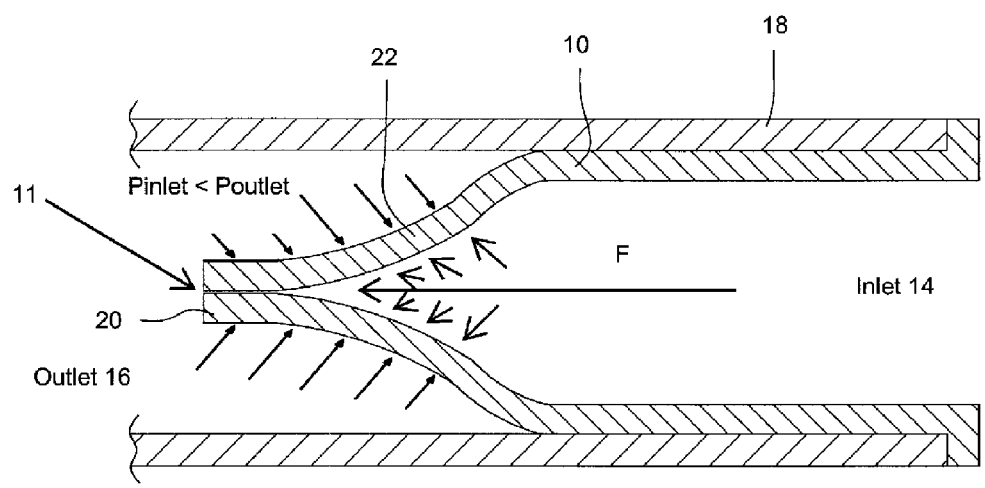
Figure 1C:
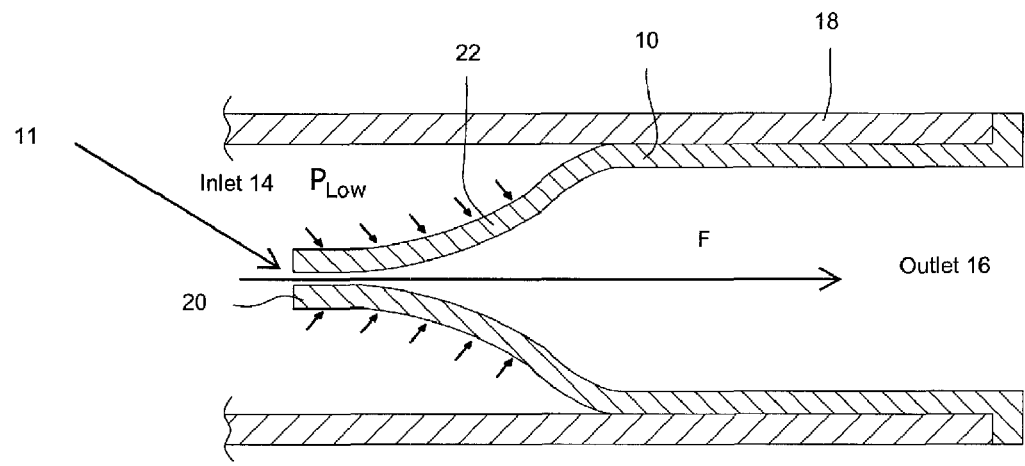
Figure 1D:
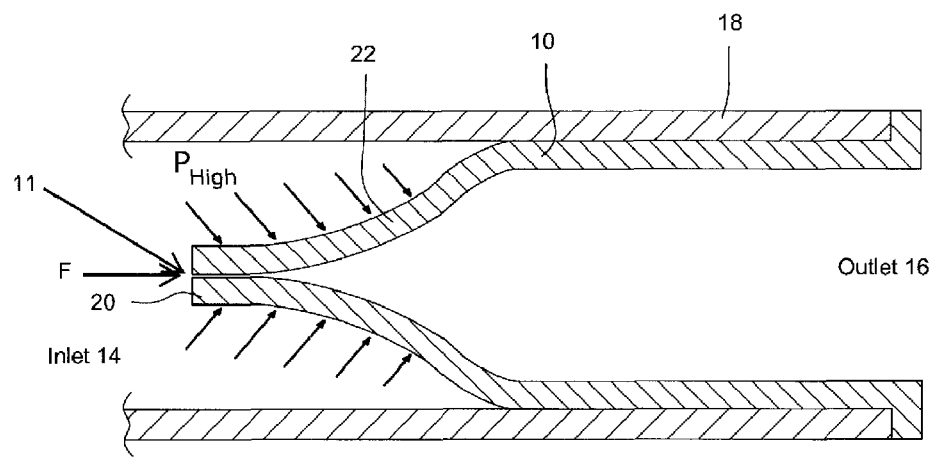

FIGS. 1A and 1B illustrate a duckbill check valve 10 with a conical end, comprising a nozzle 20 and a neck 22, that is aligned with the direction of fluid flow. Nozzle 20 and neck 22 are sensitive to the pressure at inlet 14 ($P_{inlet}$) and outlet 16 ($P_{outlet}$). More particularly, $P_{outlet}$ acts on the outside of neck 22 and $P_{inlet}$ acts on the inside, and if $P_{outlet}$ is lower than $P_{inlet}$ then orifice 11 expands in effective diameter, thus allowing fluid F to freely flow from inlet 14 to outlet 16 as shown in FIG. 1A. Conversely, if $P_{outlet}$ is higher than $P_{inlet}$ then the effective diameter of orifice 11 contracts in effective diameter to restrict the flow of fluid F in any direction, as shown in FIG. 1B. When $P_{outlet}$ is sufficiently high, nozzle 20 may be shut off. Commonly owned, co-pending U.S. Pub. Appl. No. 2005/0118468, which is incorporated herein by reference in its entirety, provides further discussion of such variable diameter orifices.

FIGS. 1C and 1D illustrate a duckbill check valve 10 with a conical end, comprising a nozzle 20 and a neck 22 that faces the direction of fluid flow, e.g., the flow of fuel from a fuel cartridge connected to inlet 14. In this embodiment, $P_{inlet}$ acts on the outside of neck 22, and if $P_{inlet}$ is relatively low (e.g., $P_{inlet}$ is at least about X psi lower than $P_{outlet}$) then orifice 11 expands in effective diameter, thus allowing fluid F to freely flow from inlet 14 to outlet 16 as shown in FIG. 1C. Conversely, if $P_{inlet}$ is relatively high (e.g., $P_{inlet}$ is at least X psi greater than $P_{outlet}$) then the effective diameter of orifice 11 contracts in effective diameter to restrict the flow of fluid F in any direction, as shown in FIG. 1D. When $P_{inlet}$ is sufficiently high, nozzle 20 may be shut off. Thus, in this embodiment, duckbill check valve 10 restricts fluid flow in such a way that high inlet pressure closes valve 10. X psi can be at least 0.5 psi, preferably at least 1.0 psi, more preferably at least 2.0 psi, even more preferably at least 5.0 psi, and most preferably at least 10 psi. This embodiment is described in the parent case, which has been previously incorporated by reference in its entirety.

FIGS. 2A-2B, 3, and 4 illustrate conical check valve 12 comprising a first valve component 24, which is a conically shaped elastomeric shell and is similar to duckbill valve 10, and a second valve component 26, which is a cylindrical pin disposed through the conical shell. Such a two-component design of valve 12 reduces the cost of manufacturing and helps automate assembly. Conical shell 24 has a round, apical orifice 13 with a variable effective diameter, and a base portion 28 that is sealed between two parts of housing 30. The conical shell 24 can be constructed from any suitable flexible elastomeric material known in the art including, but not limited to, rubber, urethane, or silicone. The elastomeric material should be substantially inert to fluid F.

Figure 2A:
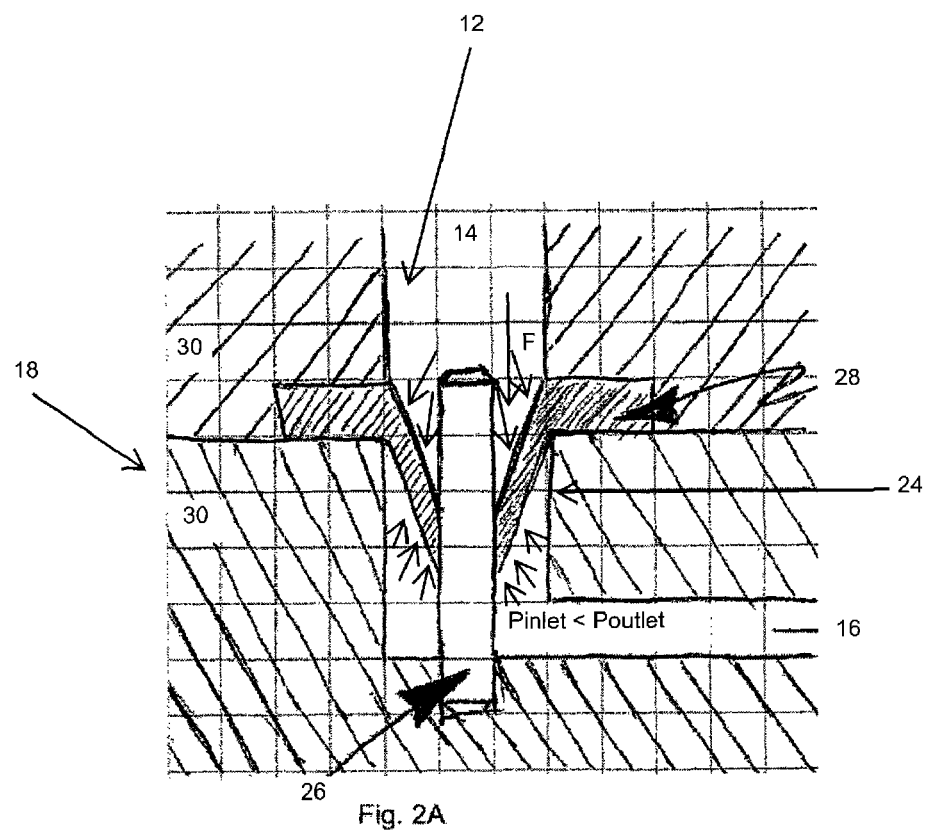
FIGS. 2A and 2B are cross-sectional views of a conical check valve having a variable diameter orifice.

Cylindrical pin 26 is preferably made of a rigid material, such as metal, plastic, or the like. As shown in FIG. 2A, cylindrical pin 26 is fixed at one end to housing 30 and longitudinally extends up and through orifice 13 and into conical shell 24. In alternate embodiments, cylindrical pin 26 could be fixed at both ends, or it could be constrained such that it has limited movement. In an exemplary embodiment, pin 26 sealingly mates with conical shell 24, as shown in FIG. 2A, when $P_{outlet}$ is greater than $P_{inlet}$ by X psi, as discussed above. More particularly, a relatively high $P_{outlet}$ causes the effective diameter of orifice 13 to contract to a dimension that is smaller than the outside diameter of pin 26, thus sealing orifice 13 to pin 26 and thereby minimizing or preventing the backflow of fluid F from outlet 16 towards inlet 14. In one alternate embodiment, pin 26 can sealingly mate with conical shell 24 when $P_{inlet}$ equals $P_{outlet}$ by designing a conical shell 24 with an apical orifice 13 having a diameter smaller than the outer diameter of pin 26. In yet another alternate embodiment, by designing enough interference between the conical shell 24 and pin 26, pin 26 can sealingly mate with conical shell 24 when $P_{inlet}$ is greater than $P_{outlet}$ until a preset differential pressure is reached. The seal formed by the conical check valve 12 in the above embodiments has been found to be superior than seals formed by conventional hard seat valves and conventional duckbill type valves.

Figure 2B:
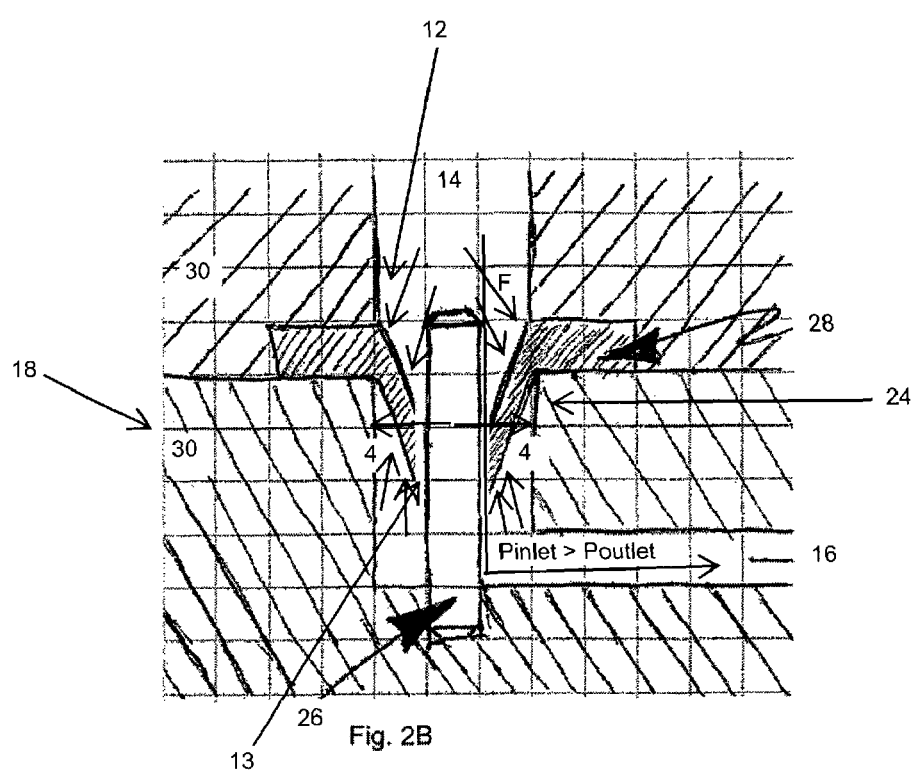
Figure 3:
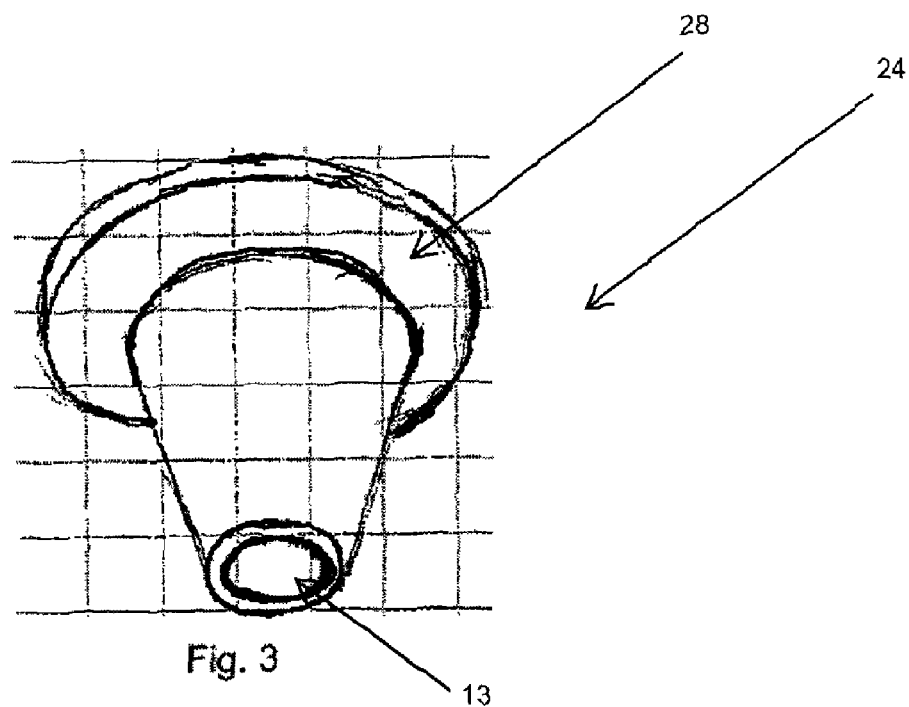
FIG. 3 is a front perspective view of one component of a conical check valve.

FIG. 2B illustrates that, in an exemplary embodiment, when $P_{inlet}$ exceeds a certain threshold cracking pressure, i.e., the minimum upstream pressure at which the valve operates, the effective diameter of orifice 13 increases such that shell component 24 is stretched off pin 26. Consequently, fluid F flows from inlet 14 to outlet 16 through the gap between orifice 13 and pin 26. Advantageously, the components of conical check valve 12 can be designed so that it can open at very low cracking pressures and still positively seal against backflow, unlike conventional check valves such as ball-and-spring check valves. One can vary the cracking pressure by adjusting the angle or thickness of cone 24, or by adjusting the dimensions of apical orifice 13. By adjusting such design elements to lower cracking pressure, one can use conical check valve 12 in low pressure flow applications including, for example, fuel cells and fuel cell cartridges.

Figure 4:
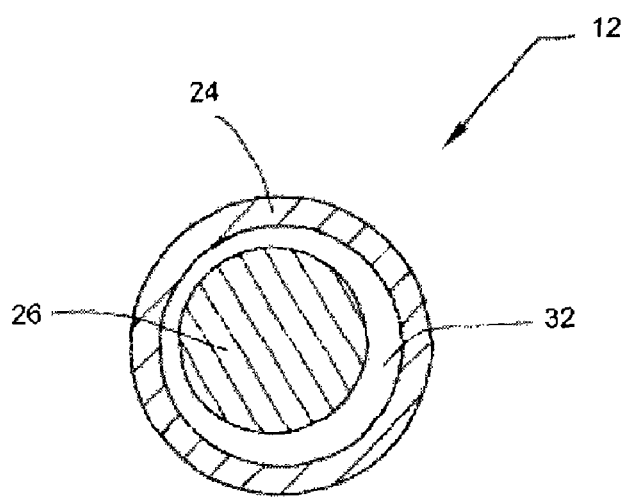
FIG. 4 is a cross-sectional view of FIG. 2B along line 4-4.

As mentioned above, the two-component design of conical check valve 12 provides manufacturing advantages. FIG. 4, which is a cross-sectional view of conical check valve 12 along line 4-4 in FIG. 2B, illustrates one such manufacturing advantage. Typically, because conical cone 24 should have an inner diameter that is relatively small with low tolerances when used without pin 26, the manufacture of cone 24 alone may be difficult or expensive. However, as shown in FIG. 4, if one manufactures conical cone 24 with a pin 26 disposed therein, which causes a consequential reduction in the inner diameter of cone 24, fluid F can then be transported through the annular space 32 between cone 24 and pin 26. This method of reducing the inner diameter of cone 24 results in reduced manufacturing cost, because with pin 26 the dimensions of conical cone 24 and pin 26 can be larger while keeping annular space 32 small.

While it is apparent that the illustrative embodiments of the invention disclosed herein fulfill the objectives stated above, it is appreciated that numerous modifications and other embodiments may be devised by those skilled in the art. For example, although the present embodiment has been illustrated with right cylindrical cone elastomer shell 24 and circular cylindrical pin 26, other embodiments are readily envisioned, e.g., a right oval cone and oval cylinder pin, or an oblique circular cone and oval cylindrical pin. Additionally, more than one check valve may be used; two or more check valves may be aligned in series or parallel to regulate fluid flow. Therefore, it will be understood that the appended claims are intended to cover all such modifications and embodiments which would come within the spirit and scope of the present invention.

What is claimed is:

1. A valve comprising a variable diameter orifice, wherein the variable diameter orifice is responsive to a difference between an inlet pressure and an outlet pressure, wherein the valve is fluidically connected to a fuel supply and at least one of the inlet and outlet pressures corresponds to a pressure of the fuel supply,
   wherein the valve comprises a conical shell, said conical shell has an apex defining the variable diameter orifice and said conical shell's base is sealingly attached to a housing of the valve, wherein a shape of the conical shell is substantially the same after attachment to the housing as before attachment,
   wherein the valve further comprises a pin connected to the housing and a portion of the pin traverses through the variable diameter orifice, and
   wherein the orifice expands to allow fuel to flow through an annular opening between the orifice and the pin and contracts to establish a seal between the shell and the pin.

2. The valve of claim 1, wherein the difference between the inlet pressure and the outlet pressure is at least about 0.5 psi.

3. The valve of claim 2, wherein the difference between the inlet pressure and the outlet pressure is at least about 1.0 psi.

4. The valve of claim 3, wherein the difference between the inlet pressure and the outlet pressure is at least about 2.0 psi.

5. The valve of claim 4, wherein the difference between the inlet pressure and the outlet pressure is at least about 5.0 psi.

6. The valve of claim 5, wherein the difference between the inlet pressure and the outlet pressure is at least about 10.0 psi.

7. The valve of claim 1, wherein the orifice expands when the inlet pressure is greater than the outlet pressure.

8. The valve of claim 1, wherein the orifice contracts when the inlet pressure is less than the outlet pressure.

9. The valve of claim 1, wherein the orifice contracts to establish a seal when the inlet pressure substantially equals the outlet pressure.

10. The valve of claim 1, wherein the orifice contracts when the inlet pressure is greater than the outlet pressure.

11. The valve of claim 1, wherein the conical shell comprises a duckbill valve.

12. The valve of claim 1, wherein the fuel supply is a fuel cartridge or a gas-generating apparatus.

13. The valve of claim 1, wherein the other of the inlet and outlet pressures corresponds to a pressure of a fuel cell.

14. A method of controlling flow of a fuel, comprising the steps of:
   a. providing a conduit comprising an inlet and outlet, wherein the conduit is fluidically connected to a fuel supply at the inlet;
   b. attaching a conical valve within the conduit, wherein the conical valve comprises a conical end with a variable diameter orifice, and wherein the conical end faces upstream flow; and
   c. substantially maintaining a shape of the conical end after the conical valve is attached within the conduit as before the conical valve is attached within the conduit;
   d. allowing the variable diameter orifice to expand or contract in response to the pressure at the inlet.

15. The method of claim 14, wherein the conical valve further comprises a pin wherein a portion of the pin traverses through the variable diameter orifice.

16. The method of claim 14, wherein the variable diameter orifice expands when the inlet pressure is at least about 0.5 psi lower than pressure at the outlet.

17. The method of claim 16, wherein the variable diameter orifice expands when the inlet pressure is at least about 1.0 psi lower than pressure at the outlet.

18. The method of claim 17, wherein the variable diameter orifice expands when the inlet pressure is at least about 2.0 psi lower than pressure at the outlet.

19. The method of claim 18, wherein the variable diameter orifice expands when the inlet pressure is at least about 5.0 psi lower than pressure at the outlet.

20. The method of claim 19, wherein the variable diameter orifice expands when the inlet pressure is at least about 10 psi lower than pressure at the outlet.

21. The method of claim 14, wherein the variable diameter orifice contracts when the inlet pressure is at least about 0.5 psi higher than pressure at the outlet.

22. The method of claim 21, wherein the variable diameter orifice contracts when the inlet pressure is at least about 1.0 psi higher than pressure at the outlet.

23. The method of claim 22, wherein the variable diameter orifice contracts when the inlet pressure is at least about 2.0 psi higher than pressure at the outlet.

24. The method of claim 23, wherein the variable diameter orifice contracts when the inlet pressure is at least 5.0 psi higher than pressure at the outlet.

25. The method of claim 24, wherein the variable diameter orifice contracts when the inlet pressure is at least 10.0 psi higher than pressure at the outlet.

26. The method of claim 14, wherein the fuel supply is a fuel cartridge or a gas-generating apparatus.

27. The method of claim 14, wherein the conduit is fluidically connected to a fuel cell at the outlet.

* * * * *